Figure 1:
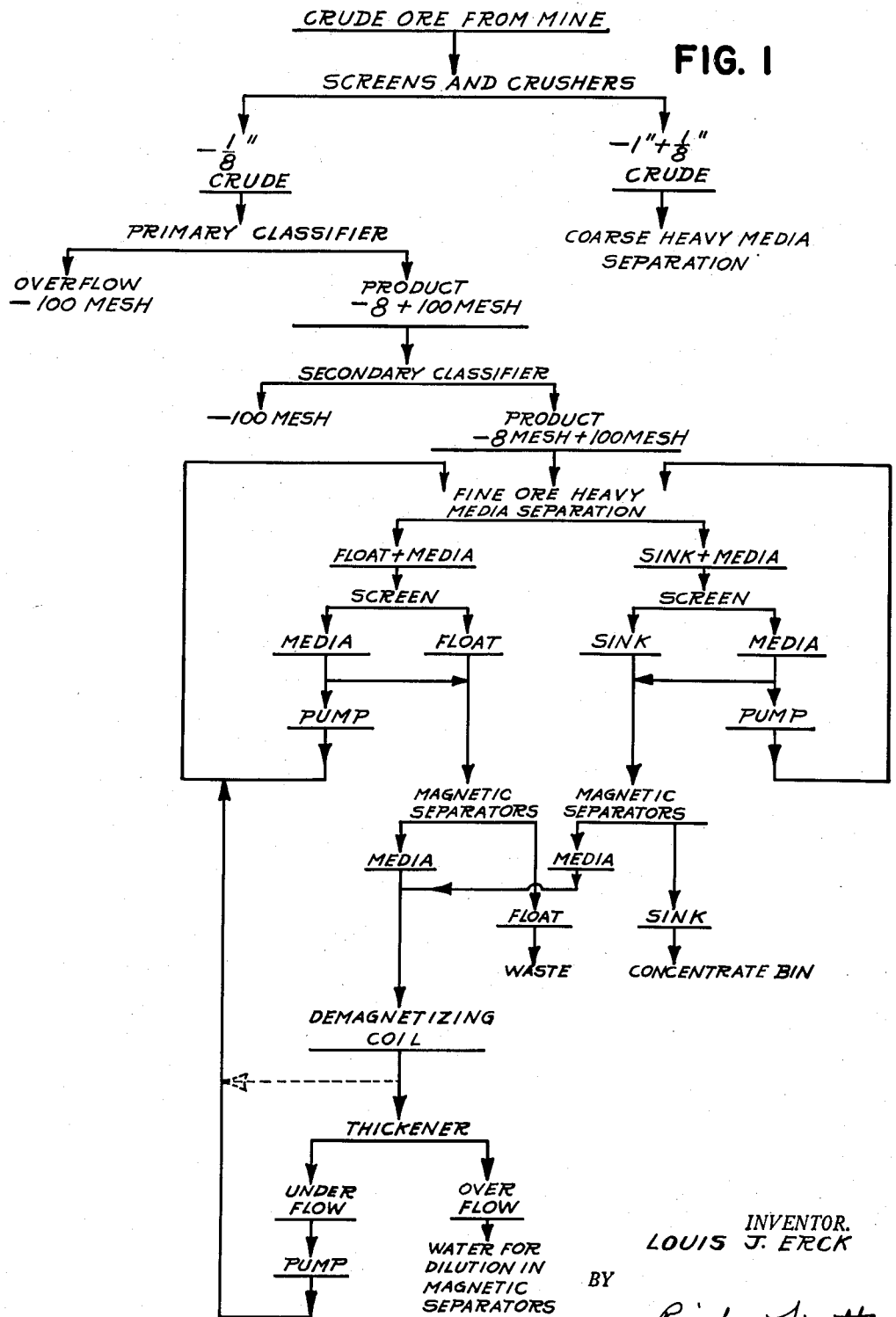

May 8, 1956     L. J. ERCK     2,744,627
METHOD OF CONCENTRATING ORES

Filed Jan. 17, 1951     2 Sheets-Sheet 1

INVENTOR.
LOUIS J. ERCK
BY
Richey & Watts
ATTORNEYS

# United States Patent Office 2,744,627
Patented May 8, 1956

2,744,627

METHOD OF CONCENTRATING ORES

Louis J. Erck, Negaunee, Mich., assignor to The Cleveland-Cliffs Iron Company, Cleveland, Ohio, a corporation of Ohio Application January 17, 1951, Serial No. 206,448

17 Claims. (Cl. 209—172.5)

The present invention relates to the ore-dressing branch of the metallurgical art and is more particularly concerned with a novel method of producing commercial quality ore concentrates from marginal or low-grade ores in an efficient economical and commercial manner. This invention is furthermore concerned with the novel method of treating ore fines to obtain an adequate recovery approaching theoretical and to obtain a good grade concentrate at the same time.

The large proportion of iron ore mined in this country at present is of such grade that treatment of it to improve its iron-gangue ratio is an economic necessity and an almost universal practice. Furthermore, as the better grades of ores are rapidly being depleted, the industry is turning its attention more to marginal or low-grade ores and is consequently vitally concerned with any method or means whereby these ores can be more economically prepared and up-graded or brought into the realm of commercial possibility so far as their concentration is concerned. Accordingly, numerous serious efforts have been made by others skilled in the art to provide such a method or means or combination thereof. Some of these efforts have resulted in the present commercial practices, but they all represent something substantially less than the desired objectives because they are predicated upon expensive compromises between various shortcomings and difficulties.

In accordance with the present commercial practice, ore coming from the mine is screened, crushed and screened again whereby the coarse fraction is separated from the fine fraction, the former ranging in size from ⅛ inch to about 1¼ inch, while the latter is less than ⅛ inch particle size. The crude coarse material according to the almost universal practice in this country is treated and prepared for reduction in the blast furnace by a method known in the industry as the "heavy media process," substantially all the gangue being separated and removed from the iron-containing portion of this fraction by this method which takes advantage of the difference in gravities of the gangue and iron-containing portions. The iron compounds are sunk and entrained in a freely-flowable, solid-liquid medium while the gangue is floated off and overflowed from a separating vessel. A variety of apparatuses are available to accomplish this separation and the flow sheet becomes rather complicated because of the economic necessity of separating substantially all the medium solids from the ore fractions from recirculation. Preferably, these medium solids are magnetic to facilitate their rapid and effective separation from the various ore fractions, special separating equipment being provided for this purpose. Ferrosilicon and magnetite are two of the materials more widely used in the heavy media process.

Treatment of the fine fraction is not so uniform a practice but varies with different concerns, the simplest involving merely subjecting the fine materials to treatment in a suitable primary classifier whereby the fraction capable of passing a 100-mesh screen is floated and overflowed and the remainder of the classifier charge constitutes the final product. Where the ore is initially a relatively rich one, it is possible to meet the silica-content specifications of the steel companies without further processing the fine ore, the coarse and fine ore fractions being combined at this stage, the coarse fraction having been treated in accordance with the heavy media process. This type of fine ore fraction, of course, represents a practically theoretical recovery but the final product necessarily tends to run high in silica so that in the less rich ores further processing is required to meet specifications.

Another method designed to meet this difficulty involves treating the final product of the primary classifier in an abrasion mill, suitably of the ball type, where the relatively soft silica and any other gangue particles are crushed while the harder iron-containing particles are left unaffected and unreduced. The abrasion mill product is next treated in a classifier and then again in another classifier, the overflow from each carrying off substantially all the fines and the overflow from the second classifier being returned to the aforesaid primary classifier where the initial separation between the coarse and fine ore fractions is made. This second classifier product is settled and then combined with the coarse fraction product emerging from the heavy media process. The recovery in this operation is necessarily substantially less than that of the foregoing process, but the grade of the concentrate recovered is higher than than that of the first process, ore values in substantial amounts being thus sacrificed as a compromise to improve product grade.

A third procedure is like the second, except that the abrasion mill product, after suitable desliming in a conventional type classifier, is treated in a conventional Humphrey spiral concentrator. In both this practice and in the second process above the overflow fines from the classifier may be of any suitable size range, but generally the fines which will pass a 48-mesh screen are carried off in the overflow and in some instances the separation is made down to minus 28-mesh size. The grade of the concentrate product thus is improved; but again at the expense of efficiency, i. e. proportion of iron values recovered from the fine fraction.

Attempts heretofore to avoid having to make these expensive compromises between recovery and grade have never been successful. These attempts have involved the unsuccessful application of the heavy media process, as distinguished from the hydraulic separations of the foregoing and similar methods, to the fine fraction. While the heavy media process may generally be applied to ore fractions of particle size in the range of ⅛ inch or ¼ inch to 1 inch or 1¼ inch size, this process is not at all satisfactory or commercial as applied to ore fractions of particle size below this range. The fine fraction is difficult to separate from the medium and thus tends to collect and build up in the medium, changing the density and viscosity of the medium so that it is incapable of producing consistently the desired separating results. In fact, even when substantially no fine fraction is associated with or treated in the heavy media process, difficulty is encountered frequently in the separation of middlings containing sustantial and objectional quantities of silica, these middlings finding their way into the concentrate despite everything that can be done to prevent this in accordance with the prior art.

While the foregoing summary of the state of the art is concerned specifically with iron ore processing, it will be understood that similar problems face those who treat coal, zinc ores, lead ores and other mine products. It will be understood, accordingly, that this invention is addressed generally to all these fields and has application to all of them as indicated in the opening statement of this specification. Thus, as used herein and in the appended claims, the terms "ore" and "minerals" mean and includes coal in addition to the metal compounds of nature generally covered by these terms.

It is accordingly a primary object of this invention to provide a means or method whereby the concentration of desirable constituents of mine products may be accomplished in a substantially more advantageous manner than possible heretofore.

It is another important object of my invention to provide a solution to the problem of bringing marginal or low-grade ores into the realm of commercial operations so that they may be exploited and developed to economic advantage as rapidly dwindling richer ores are exhausted.

It is a further major object of my present invention to provide a method or means of producing commercial quality iron ore concentrate from marginal or low-grade ores in a manner which is better than any heretofore known to the art and which is practical and commercial and thus constitutes success where the prior art failed in solving the problems above stated.

It is another object of this invention to provide a method which may be employed in a commercial operation in an economical and practical manner to improve substantially the economics of the presently generally employed iron ore dressing operations.

It is still another object of my invention to provide a method whereby the foregoing objectives may be realized without the necessity of either materially revising the standard flow sheets of the prior art or providing any special or unusual apparatus or equipment.

It is a still further object of this invention to afford a practical and commercial solution to the serious problem of separating the silica-containing middlings from concentrate, particularly in the treatment of the coarse ore fractions.

It is an additional object of this invention to provide a method for carrying out the last-stated objective in an economical and commercial manner with the result that there is a net gain on the economic side over the heretofore standard practice of dressing the coarser grades of ore between about ⅛ inch and about 1¼ inch size.

Another object of this invention is to enable the practice of the last-mentioned method without additional or unusual apparatus and without substantial reconstruction or redesign of the apparatus ordinarily employed in conventional ore dressing operations as applied to coarser ore fractions.

All the foregoing objects and additional objects and novel and important advantages can be obtained as a result of this invention, which is predicated upon certain surprising discoveries I have made. One of these discoveries concerns the peculiar behavior of the middlings and float products of iron ores in the heavy media process carried out in an Akins Classifier or a Hardinge heavy media separator, for example, when a portion of medium is introduced toward the upper or discharge end of the device and is thus run counter to the flow of the sink product. It is also based upon my discovery that vary sharp separations can be made between materials of substantially different gravities, as found in the iron-containing portions and silica portions of iron ore of the marginal type, using a medium which has a gravity substantially below that of both the ore fractions. I have found, in fact, that media which are not self-sustaining and are unstable and subject to rapid breakdown, in contrast to those which have always heretofore been employed in accordance with the prior art teachings, may be used to produce these new results and to obtain the foregoing advantages and objectives. Thus, the behavior of ore fines treated in accordance with my invention, as well as the nature and behavior of the media employed, is peculiar and heretofore unpredicted and constitutes a paradox in the light of the knowledge evolved in the development of this art.

Generally, the method of my invention comprises the steps of mixing crude mine product containing primarily mineral values and gangue with a freely-flowable, solid-liquid medium of apparent density substantially less than that of the mineral values, floating the gangue on the medium and sinking the mineral values in it, flowing a portion of the medium together with a portion of the sunken mineral fraction away from the remainder of the medium and the floating fraction, introducing an additional portion of a freely-flowable, solid-liquid medium of density substantially less than that of the mineral values into the resulting stream of medium and sunken mineral fraction at a point spaced from the stream source, and flowing the last-introduced medium counter to and in contact with the said stream. Thus this present method involves the establishment and maintenance of a plurality of media strata of substantially different gravities. This condition is established in accordance with the preferred practice of this invention by selection of the solid portion of the medium to be used as to structure, i. e., particle size distribution, so that when these medium solids are admixed with water as customary, a freely-flowable, solid-liquid mass will be produced and this mass will tend readily to stratify to enable the ore fraction separations desired as will be described subsequently in more detail.

Figure 2:
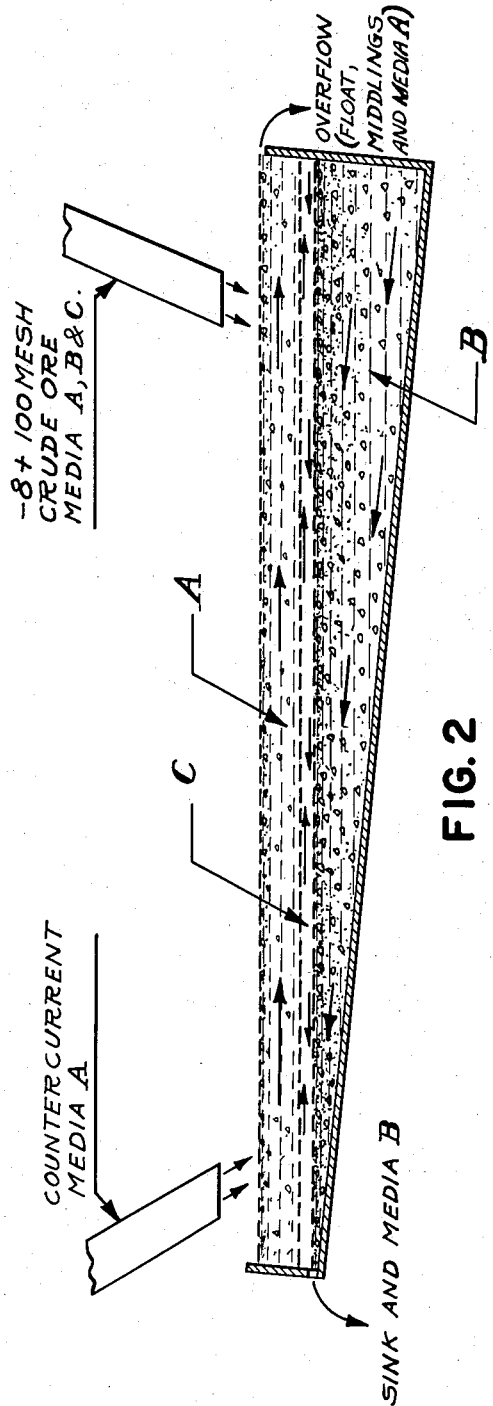

Those skilled in the art will gain a better understanding of this invention upon consideration of the detailed description of the method hereof in a preferred embodiment, reference being had to the drawings accompanying and forming a part of this specification, in which:

Fig. 1 is a flow sheet of this method designed for a commercial iron ore dressing operation; and, Fig. 2 is a schematic view of an ore-medium system established and maintained in any suitable separatory vessel in accordance with my discovery and method of this invention in a preferred form.

With reference to Fig. 1, the process of this invention as I prefer to carry it out, involves a number of steps in a series beginning with crude iron ore coming from the mine and ending with a high grade concentrate which represents a recovery approaching theoretical of the ore values in this mine product, certain media separating and recirculating steps being carried out as a matter of economics in the continuous operation of the process. The crude mine product is screened and crushed and screened again to produce two fractions for further treatment in the process, i. e., a coarse fraction of particle size from about ⅛ inch to about 1 inch and a fine fraction of particle size less than about ⅛ inch. As stated above, the coarse fraction is treated in the heavy media process with the result that a concentrate of the required iron content is produced, sufficient gangue being removed therefrom with the overflow from the sink-float system. In this particular portion of the flow sheet, I have found it advantageous to introduce medium toward the upper or concentrate discharge end of the separatory vessel, such as a conventional Hardinge counter-current separator. The portion of the ore floating on the surface of the medium for overflow at the lower end of the separatory vessel flows in a direction substantially opposite to the stream of medium containing the sink wherein the iron values are concentrated. The middlings containing objectionable amounts of silica in association with some iron values normally are carried along to a large extent with the sink despite all that can be done to prevent it. This difficulty is entirely eliminated and no additional expense or other difficulty is entailed through the practice of this invention involving the introduction of a portion of medium into the bucket compartment, for example, of a Hardinge machine. This medium may be the same as that introduced into the machine together with the ore fraction being treated, or it may be some other medium composition which is compatible for the purposes of the process with the first medium. The middlings are, unexpectedly, substantially all sequestered by this second medium and carried off toward the float discharge end of the machine and away from the sink product and the medium associated and flowed therewith.

Turning to the details of the present process as concerned particularly with the treatment of the fine fraction of crude iron ore, this product is run through a primary classifier and a secondary classifier in each of which the material which will pass in a 100-mesh screen is separated and overflowed. The remaining ore constitutes the product which is introduced into a heavy media separating vessel such as an Akins Classifier or a Hardinge counter-current separator, as illustrated diagrammatically in Fig. 2. This ore fraction may suitably be premixed with medium for introduction into the separator as also indicated in Fig. 2. In this vessel, a sink product and a float product are formed and separated from each other, the sink product being removed from the upper end of the vessel while the float product overflows through a weir.

The medium employed to accomplish this sharp separation rapidly and efficiently preferably is of a gravity between about 1.6 or 1.7 and about that of quartz, i. e., about 2.6. In any event, the gravity and the percent of solids contained in the medium, excepting ore solids, should be such that the difference between the circulating density of the medium and the separating density thereof is at least about 0.8, but this value may reach about 1.3. A medium meeting these requirements may be prepared using ferrosilicon, 59% of which is sufficiently fine to pass a 325-mesh screen. The structure of ferrosilicon which I have used with consistent success had the following structure:

| Screen size | Percent weight |
|---|---|
| +48 | .02 |
| +65 | .04 |
| +100 | 8.14 |
| +150 | 12.12 |
| +200 | 9.60 |
| +325 | 10.92 |
| −325 | 59.16 |
| | 100.00 |

Any substantial variation in the structure of this medium I have found to constitute a hazard to successful practice of the present process. Distribution of the sizes of the ferrosilicon particles, in other words, is an important factor determining the practicability of the overall operation, it being important to maintain a predominance of the minus 325-mesh material and lesser proportions of larger particles. In the better practice virtually no ferrosilicon particles larger than about plus 48-mesh screen size will be included in these media.

As another illustration of the type of material which may be used to make media for the practice of this invention, the following is a magnetite structure which I have found to be reliable in actual practice, consistently producing the aforesaid advantages of this invention:

| Screen size | Percent weight |
|---|---|
| +35 | .10 |
| +48 | .28 |
| +65 | 1.28 |
| +100 | 7.46 |
| +150 | 11.56 |
| +200 | 15.60 |
| +325 | 31.98 |
| −325 | 31.74 |
| | 100.00 |

It will be appreciated from the foregoing illustrations that if an undue quantity or percentage of the solids used in making a medium of this invention falls in the coarser sizes, the medium may be unsuitable for making the desired separations. These coarser fractions constitute that portion of the medium known as the "transverse progression medium" which flows with and in the direction of the sink products. The finer size medium solids form the "alternate differential flow" and in the separating vessel these flow in the opposite direction and constitute the lighter or lower gravity medium and cause transportion of the light or tailing fraction of the ore to the overflow point at the lower end of the vessel. If the quantity of the fine medium particles is too small, the tailing fraction may not be kept buoyant and may become associated with the heavier medium body and carried off with the iron values, making the process less efficient or even entirely unsatisfactory, depending upon the initial grade of the ore and the degree to which the media is deficient in these fine sizes. It will thus be apparent that the operator has a certain substantial latitude in his choice of heavy media as to the structure and distribution of the media to produce the results described above. I have found that so long as one is careful to make sure that the extremely fine fraction of the solids going into a medium, i. e. those which will pass about a 325-mesh screen where magnetite is the basis of the medium, constitute between about 30% and 60% of the total medium solids, satisfactory results will be obtained providing the foregoing requirement as to the ratio of circulating medium gravity to separating medium gravity is observed and maintained in the system. In using ferrosilicon on the other hand, between about 40% and about 75% of the medium solids should be in the form of fines which will pass about a 325-mesh screen. In neither magnetite nor ferrosilicon media, however, should there be any substantial quantity of medium solid which is too large to pass about a 48-mesh screen. By this I mean that no more than about 5% of the medium solids should be of this larger size.

Media made in accordance with the foregoing requirements are not self-sustaining and consequently constitute unstable suspensions of solid ferrosilicon or magnetite or the like in water or an equivalent liquid, the amount of water being adjusted as necessary to meet the foregoing requirements as to percentage of solids and gravity ratios described above. When media of this kind are mixed with fine ore fractions, as described above, two principal layers or bodies of substantially different solid content and specific gravity are formed in the separating vessel, as illustrated in Fig. 2. In the lower heavier portion a large proportion of the iron values of the ore are contained, while in the upper layer the gangue of the ore is primarily concentrated. In the lower layer, designated B in Fig. 2, a typical constitution would be between about 60% and 80% of ore and between about 40% and 20%, respectively, of medium. In the upper portion, designated A in the Fig. 2, between about 20% and about 40% will be float material, the balance being medium. Between layers A and B there is typically a relatively thin intermediate layer designated C in the drawing. This latter is a transition layer between A and B and it affords an opportunity for the rejection of middling particles the gravities of which approximate or approach that of this layer more closely than those of either layer A or layer B. Layer C thus affords protection against middling particles finding their way into the concentrate layer B and by virtue of being in contact with two layers travelling in opposite directions remains relatively static. Removal of middling particles from layer C is accomplished in accordance with this invention by adjustment of velocity in layer A so that concentration of middlings cannot in the ordinary operation approach a level in layer C which would lead to contamination of layer B with middlings. Generally, travel of layer A is at a high rate compared to travel of layer B and layer A is accelerated substantially in the vicinity of the overflow weir with the result that middlings in layer C near the float overflow end of the machine are caught up by and retained in layer A and carried away with the float fraction. It may thus be considered that middlings are scrubbed from intermediate layer C continuously by layer A and especially by that portion of layer A travelling most rapidly.

It follows from the above that the quantity of that portion of the medium constituting layer A is maintained normally in far greater volume in the system than that constituting layer B. It follows in turn that the gravity of the medium as a whole will rather more closely approximate the gravity of portion A than portion B, and indeed in the usual case it will be found that the gravity of media A is substantially the same as the gravity of the medium as a whole, being, of course, slightly lower.

Since the media employed in accordance with this invention are not self-sustaining, it is my preferred practice to maintain the large part of the charge of medium and ore in a separating machine in motion substantially constantly. This may be accomplished by any suitably agitating means but preferably the agitation is not so vigorous as to prevent stratification. I have found where the Akins Classifier or Hardinge separator or other suitable machine is used the forces applied in normal operation of the machine will produce the desired results and maintain the medium in suspension for as long as necessary to effect the desired separation of the ore fractions. The flow of the supernatant medium will normally be constant in machines of this type, although it may be interrupted at intervals, when, for example, a rake or other device is introduced into the medium to urge the heavier portion toward the concentrate discharge end of the vessel. It may be desirable in using these machines of the prior art to modify them as to slope or to provide supplementary means to agitate the medium and ore charge, as for example, additional impelling means to be applied to layer B. In any event, however, the large part of layer B as well as the large part of layer A will be travelled within the vessel substantially constantly in the better practice to overcome any tendency for the medium to breakdown prior to discharge from the separating vessel.

Preferably, the medium and ore mixture delivered into the separating vessel is subjected, at least for a while, to a vigorous rolling action such as would be obtained through the use of the Hardinge in this process, whereby any entrapped float fraction or portion of gravity approximating layer A would be free and released from layer B to layer A through layer C.

Following the flow sheet further, concentrate and medium portion B is subjected to a screening operation on being removed from the vessel of Fig. 2, the medium passing through the screen while the sink is retained thereon, some of the medium, however, remaining associated with the sink with which it is delivered into conventional magnetic separators. The medium from the screen is delivered to a pump and returned to the heavy media separator machine of Fig. 2 for recycling with additional portions of fine ore fraction to be concentrated. The sink product obtained from the magnetic separators is delivered to the concentrate bin where it may be combined with the coarse fraction obtained from the heavy media process as described above. The medium recovered from the heavy media separators is delivered to a demagnetizing coil from which it passes to a thickener the overflow portion of which is treated for removal of a substantial portion of its water content. This water may be employed for dilution in the magnetic separators. The overflow from the thickener is pumped back into the heavy media separator for recirculation in the system with additional fine or fraction.

The float and medium portion A is subjected to a screening operation to remove a substantial part of the medium associated with the float, this medium being pumped back into the heavy media separator while the float and medium unseparated therefrom is delivered to magnetic separators. In the magnetic separators the float is released from the medium and discharged to waste while the medium is demagnetized along with the medium obtained in processing the sink medium mixture, and returned to the heavy media separator.

In the step of separating medium from concentrate, in accordance with this invention, water is delivered underneath the surface of the medium body to produce a hindered settling effect with resultant rapid and efficient release of ferrosilicon or magnetite particles from the concentrate. This action automatically places the ferrosilicon or magnetite particles in the zone for most effective use of the magnetic separation equipment and accordingly assures consistently high medium recovery.

The terms "circulating gravity" and "separating gravity" are used herein in accordance with the general usage in the art. Thus "circulating gravity" means and refers to the actual density of the medium, while "separating gravity" means and refers to the apparent density of the medium based upon the separations which can be made with it. A given medium consequently may itself have a specific gravity of 1.7, but as used in this invention may produce a separation between two ore fractions, the lighter one of which has a density of 2.5, while the density of the heavier one is substantially higher. The separating gravity of such a medium then would be said to be 2.5.

As used herein and in the appended claims the term "freely-flowable, solid-liquid medium" means and refers to the type of mass known generally in the art as heavy media. Media of this kind are disclosed in U. S. Reissue Patent No. 22,191 granted September 29, 1942, to H. H. Wade.

Having thus described the present invention so that those skilled in the art may be able to gain a better understanding and practice the same, I state that what I desire to secure by Letters Patent is defined in what is claimed.

What is claimed is:

1. The method of producing a concentrate from a crude mine product containing primarily mineral values and gangue which comprises the steps of introducing into a vessel having an upper underflow end and a lower overflow end a non-self-sustaining, freely-flowable, solid-liquid medium having a circulating density less than the density of each the mineral value fraction and the gangue fraction of said mine product, establishing in said medium in the vessel a plurality of layers including a lower heavier layer and an upper lighter layer and an intermediate layer therebetween, adding the said mine product to the thus stratified medium whereby the heavier fraction of the said product travels to and is collected in the lower layer and the lighter fraction is collected in the upper layer, moving the lower layer together with the heavier fraction therein toward the upper end of the vessel, moving the upper layer together with the lighter fraction associated therewith as a stream flowing constantly in the direction of the lower end of the vessel, and toward the upper end of the vessel introducing additional quantities of said medium into contact with the thus flowing stratified body of medium and mine product fractions.

2. The method of producing commercial quality coal concentrate from a crude mine product containing primarily coal and gangue which comprises the steps of introducing into a vessel having an upper underflow end and a lower overflow end a non-self-sustaining, freely-flowable, solid-liquid medium having a circulating density less than the density of each the coal fraction and the gangue fraction of said mine product, establishing in said medium in the vessel a plurality of layers including a lower heavier layer and an upper lighter layer and an intermediate layer therebetween, adding the said mine product to the thus stratified medium whereby the heavier fraction of the said product travels to and is collected in the lower layer and the lighter fraction is collected in the upper layer, moving the lower layer together with the heavier fraction therein toward the upper end of the vessel, moving the upper layer together with the lighter fraction associated therewith as a stream flowing constantly in the direction of the lower end of the vessel, and introducing additional quantities of said medium into contact with the thus flowing stratified body of medium and mine product fractions at a point near the upper end of the vessel.

3. The method of producing commercial quality zinc ore concentrate from a crude mine product containing primarily zinc values and gangue which comprises the steps of introducing into a vessel having an upper underflow end and a lower overflow end a non-self-sustaining, freely-flowable, solid-liquid medium having a circulating density less than the density of the gangue fraction of said mine product, establishing in said medium in the vessel a plurality of layers including a lower heavier layer and an upper lighter layer and an intermediate layer therebetween, adding the said mine product to the thus stratified medium whereby the heavier fraction of the said product travels to and is collected in the lower layer and the lighter fraction is collected in the upper layer, moving the lower layer together with the heavier fraction therein toward the upper end of the vessel, moving the upper layer together with the lighter fraction associated therewith as a stream flowing constantly in the direction of the lower end of the vessel, and introducing additional quantities of said medium into contact with the thus flowing stratified body of medium and mine product fractions at a point near the upper end of the vessel.

4. The method of producing a commercial quality lead ore concentrate from a crude mine product containing primarily lead values and gangue which comprises the steps of introducing into a vessel having an upper underflow end and a lower overflow end a non-self-sustaining, freely-flowable, solid-liquid medium having a circulating density less than the density of the gangue fraction of said mine product, establishing in said medium in the vessel a plurality of layers including a lower heavier layer and an upper lighter layer and an intermediate layer therebetween, adding the said mine product to the thus stratified medium whereby the heavier fraction of the said product travels to and is collected in the lower layer and the lighter fraction is collected in the upper layer, moving the lower layer together with the heavier fraction therein toward the upper end of the vessel, moving the upper layer together with the lighter fraction associated therewith as a stream flowing continuously in the direction of the lower end of the vessel, and introducing additional quantities of said medium into contact with the thus flowing stratified body of medium and mine product fractions at a point near the upper end of the vessel.

5. The method of producing a commercial quality copper ore concentrate from a crude mine product of particle size less than about ⅛ inch and containing primarily copper values and gangue which comprises the steps of introducing into a vessel having an upper underflow end and a lower overflow end a non-self-sustaining, freely-flowable, solid-liquid medium having a circulating density less than the density of each the mineral value fraction and the gangue fraction of said mine product, establishing in said medium in the vessel a plurality of layers including a lower heavier layer and an upper lighter layer and an intermediate layer therebetween, adding the said mine product to the thus stratified medium whereby the heavier fraction of the said product travels to and is collected in the lower layer and the lighter fraction is collected in the upper layer, moving the lower layer together with the heavier fraction therein toward the upper end of the vessel, moving the upper layer together with the lighter fraction associated therewith as a stream flowing unhindered in the direction of the lower end of the vessel, and toward the upper end of the vessel introducing additional quantities of said medium into contact with the thus flowing stratified body of medium and mine product fractions.

6. The method of producing a commercial quality iron ore concentrate from a marginal or low-grade ore containing primarily iron ore values and silica which comprises the steps of introducing into a vessel having an upper underflow end and a lower overflow end a non-self-sustaining, freely-flowable, solid-liquid medium having a circulating density less than the density of the silica, establishing in said medium in the vessel a plurality of layers including a lower heavier layer and an upper lighter layer and an intermediate layer therebetween, adding the said low-grade ore to the thus stratified medium whereby the heavier fraction of the said ore travels to and is collected in the lower layer and the lighter fraction is collected in the upper layer, moving the lower layer together with the heavier fraction therein toward the upper end of the vessel, moving the upper layer together with the lighter fraction associated therewith as a stream flowing constantly in the direction of the lower end of the vessel, and toward the upper end of the vessel introducing additional quantities of said medium into contact with the thus flowing stratified body of medium and mine product fractions.

7. The method of producing a commercial quality iron ore concentrate from a marginal or low-grade ore containing primarily iron ore values and silica which comprises the steps of introducing into a vessel having an upper underflow end and a lower overflow end a non-self-sustaining, freely-flowable, solid-liquid medium having a circulating density between about 1.7 and the specific gravity of quartz, establishing in said medium in the vessel a plurality of layers including a lower heavier layer and an upper lighter layer and an intermediate layer therebetween, adding the said low-grade ore to the thus stratified medium whereby the heavier fraction of the said ore travels to and is collected in the lower layer and the lighter fraction is collected in the upper layer, moving the lower layer together with the heavier fraction therein toward the upper end of the vessel, moving the upper layer together with the lighter fraction associated therewith as a stream flowing unhindered in the direction of the lower end of the vessel, and toward the upper end of the vessel introducing additional quantities of said medium into contact with the thus flowing stratified body of medium and mine product fractions.

8. The method of producing a commercial quality iron ore concentrate from a marginal or low-grade ore containing primarily iron ore values and silica which comprises the steps of introducing into a vessel having an upper underflow end and a lower overflow end, a non-self-sustaining, freely-flowable, solid-liquid medium having a circulating density between about 1.7 and about 2.65, said medium being a water mixture of a finely-divided, iron-containing compound selected from the group consisting of ferrosilicon, magnetite and hematite, establishing in said medium in the vessel a plurality of layers including a lower heavier layer and an upper lighter layer and an intermediate layer therebetween, adding the said low-grade ore in the form of particles which will pass an 8-mesh screen and be retained on a 100-mesh screen to the thus stratified medium whereby the heavier fraction of the said ore travels to and is collected in the lower layer and the lighter fraction is collected in the upper layer, moving the lower layer together with the heavier fraction therein toward the upper end of the vessel, moving the upper layer together with the lighter fraction associated therewith as a stream flowing constantly in the direction of the lower end of the vessel, and toward the upper end of the vessel introducing additional quantities of said medium into contact with the thus flowing stratified body of medium and mine product fractions.

9. The method of producing a commercial quality iron ore concentrate from a marginal or low-grade ore containing primarily iron ore values and silica which comprises the steps of introducing into a vessel having an upper underflow end and a lower overflow end, a non-self-sustaining, freely-flowable, solid-liquid medium having a circulating density less than the density of the silica, establishing in said medium in the vessel a plurality of layers including a lower heavier layer and an upper lighter layer and an intermediate layer therebetween, adding the said low-grade ore in the form of pieces between about ⅛ inch and about 1¼ inch to the thus stratified medium whereby the heavier fraction of the said ore travels to and is collected in the lower layer and the lighter fraction is collected in the upper layer, moving the lower layer together with the heavier fraction therein toward the upper end of the vessel, moving the upper layer together with the lighter fraction associated therewith as a stream flowing constantly in the direction of the lower end of the vessel, and at a point near the upper end of the vessel introducing additional quantities of said medium into contact with the thus flowing stratified body of medium and mine product fractions.

10. The method of producing a commercial quality iron ore concentrate from a marginal or low-grade ore containing primarily iron ore values and silica which comprises the steps of introducing into a vessel having an upper underflow end and a lower overflow end, a non-self-sustaining, freely-flowable, solid-liquid medium having a circulating density less than about 2.6, establishing in said medium in the vessel a plurality of layers including a lower heavier layer and an upper lighter layer and an intermediate layer therebetween, adding the said low-grade ore in the form of particles which will pass an 8-mesh screen to the thus stratified medium whereby the heavier fraction of the said ore travels to and is collected in the lower layer and the lighter fraction is collected in the upper layer, moving the lower layer together with the heavier fraction therein toward the upper end of the vessel, moving the upper layer together with the lighter fraction associated therewith as a stream flowing constantly in the direction of the lower end of the vessel, toward the upper end of the vessel introducing additional quantities of said medium into contact with the thus flowing stratified body of medium and mine product fractions, and separating and removing from the vessel the heavier fraction comprising primarily iron compounds together with a part of the medium comprising the said lower layer.

11. The method of producing a commercial quality iron ore concentrate from a marginal or low-grade ore containing primarily iron ore values and silica which comprises the steps of separating and removing from a mass of marginal ore of mixed particle sizes the portion which will pass through an 8-mesh screen, introducing into a vessel having an upper underflow end and a lower overflow end a non-self-sustaining, freely-flowable, solid-liquid medium having a circulating density less than the density of the heaviest part of the ore but greater than that of water, establishing in said medium in the vessel a plurality of layers including a lower heavier layer and an upper lighter layer and an intermediate layer therebetween, adding the said separated and removed portion of the ore to the thus stratified medium whereby the heavier fraction of the said ore travels to and is collected in the lower layer and the lighter fraction is collected in the upper layer, substantially constantly agitating said lower layer together with the heavier ore fraction therein, moving the upper layer together with the lighter fraction associated therewith as a stream flowing constantly in the direction of the lower end of the vessel, toward the upper end of the vessel introducing additional quantities of said medium into contact with the thus flowing stratified body of medium and mine product fractions, and separating and removing from the vessel the said lower layer together with the heavier fraction therein comprising primarily iron compounds.

12. The method of producing a commercial quality iron ore concentrate from a marginal or low-grade ore containing primarily iron ore values and silica which comprises the steps of introducing into a vessel having an upper underflow end and a lower overflow end, a non-self-sustaining, freely-flowable, solid-liquid medium having a circulating density less than the density of the silica, establishing in said medium in the vessel a plurality of layers including a lower heavier layer and an upper lighter layer and an intermediate layer therebetween, substantially continuously adding the said low-grade ore to the thus stratified medium whereby the heavier fraction of the said ore travels to and is collected in the lower layer and the lighter fraction is collected in the upper layer, substantially continuously moving the lower layer together with the heavier fraction therein toward the upper end of the vessel, substantially continuously moving the upper layer together with the lighter fraction associated therewith as a stream flowing unhindered in the direction of the lower end of the vessel, toward the upper end of the vessel substantially continuously introducing additional quantities of said medium into contact with the thus flowing stratified body of medium and mine product fractions, and substantially continuously removing from the upper end of the vessel portions of the lower layer and heavier fraction therein and removing from the lower end of the vessel portions of the lighter layer and lighter fraction associated therewith.

13. The method of producing a commercial quality iron ore concentrate from a marginal or low-grade ore through the use of a non-self-sustaining, freely-flowable, solid-liquid medium having a circulating density substantially greater than the density of water and a separating density greater than said circulating density by between about 0.8 and about 1.3, which comprises introducing said medium into a vessel having an upper underflow end and a lower overflow end and establishing in the medium in said vessel a plurality of layers including a lower heavier layer and an upper lighter layer and an intermediate layer therebetween, dropping said ore of particle size less than about ½ inch onto the surface of the thus stratified medium whereby the heavier fraction of the ore is accumulated in the lower layer and the lighter fraction of ore is collected in the upper layer because of a barrier action exerted against said lighter fraction, by the intermediate layer, moving the lower layer together with the heavier fraction therein toward the upper end of the vessel, moving the upper layer together with the lighter fraction as a continuous stream flowing toward the lower end of the vessel, introducing into the vessel on the surface of said medium near the upper end of said vessel additional quantities of medium, and removing from the vessel through said upper underflow end portions of the lower layer and associated heavier ore fraction and removing from the lower overflow end portions of the upper layer and associated lighter ore fraction.

14. The method of producing a commercial quality iron ore concentrate from a marginal or low-grade ore through the use of a non-self-sustaining, freely-flowable, solid-liquid, aqueous medium of ferrosilicon in which between about 40% and about 75% of the solid mass is of less than 325-mesh size and substantially no particles are too large to pass a 48-mesh screen, said medium having a circulating density substantially greater than the density of water and a separating density greater than said circulating density by between about 0.8 and about 1.3, which comprises introducing said medium into a vessel having an upper underflow end and a lower overflow end and establishing in the medium in said vessel a plurality of layers including a lower heavier layer and an upper lighter layer and an intermediate layer therebetween, dropping said ore of particle size less than about ½ inch onto the surface of the thus stratified medium whereby the heavier fraction of the ore is accumulated in the lower layer and the lighter fraction of ore is collected in the upper layer because of a barrier action exerted against said lighter fraction by the intermediate layer, moving the lower layer together with the heavier fraction therein toward the upper end of the vessel, moving the upper layer together with the lighter fraction as a continuous stream flowing toward the lower end of the vessel, introducing into the vessel on the surface of said medium near the upper end of said vessel additional quantities of medium, substantially continuously removing from the vessel through said upper underflow end portions of the lower layer and associated heavier ore fraction, and substantially continuously removing from the lower overflow end portions of the upper layer and associated lighter ore fraction.

15. The method of producing a commercial quality iron ore concentrate from a marginal or low-grade ore through the use of a non-self-sustaining, freely-flowable, solid-liquid, aqueous medium of magnetite in which between about 30% and about 60% of the solid mass is of less than 325-mesh size and substantially no particles are too large to pass a 48-mesh screen, said medium having a circulating density substantially greater than the density of water and a separating density greater than said circulating density by between about 0.8 and about 1.3, which comprises introducing said medium into a vessel having an upper underflow end and a lower overflow end and establishing in the medium in said vessel a plurality of layers including a lower heavier layer and an upper lighter layer and an intermediate layer therebetween, dropping said ore of particle size less than about ½ inch onto the surface of the thus stratified medium whereby the heavier fraction of the ore is accumulated in the lower layer and the lighter fraction of ore is collected in the upper layer because of a barrier action exerted against said lighter fraction by the intermediate layer, moving the lower layer together with the heavier fraction therein toward the upper end of the vessel, moving the upper layer together with the lighter fraction as a continuous stream flowing toward the lower end of the vessel, introducing into the vessel on the surface of said medium near the upper end of said vessel additional quantities of medium, removing from the vessel through said upper underflow end portions of the lower layer and associated heavier ore fraction and removing from the lower overflow end portions of the upper layer and associated lighter ore fraction, separating medium from said associated heavier and lighter ore fractions and returning the separated medium to the vessel in a repetition of the cycle.

16. The method of producing commercial quality iron ore concentrate from a marginal or low-grade ore which comprises the steps of mixing the marginal ore of particle size which will pass an 8-mesh screen and containing primarily iron values and silica with a non-self-sustaining, freely-flowable, solid-liquid medium of density between about 1.7 and about 2.6, whereby the iron values are collected in one part of the resulting mixture and the silica is collected in another part of the said mixture, moving a portion of said medium together with iron values collected therein away from the remainder of said medium and the silica collected therein, bringing another portion of said medium into contact with the resulting stream of medium and sunken ore fraction at a point spaced from said remainder of said medium and silica, and flowing the last introduced medium in contact with the said stream and in a direction counter to the direction of flow of said stream.

17. The method of producing commercial quality iron ore concentrate from a marginal or low-grade ore which comprises the steps of mixing the marginal ore of particle size which will pass an 8-mesh screen and be retained on a 100-mesh screen and containing primarily iron values and silica with a non-self-sustaining, freely-flowable, solid-liquid medium of density between about 1.7 and about 2.65, said medium being a water mixture of a finely divided iron-containing compound selected from the group consisting of ferrosilicon, magnetite and hematite, whereby the iron values are collected in one part of the resulting mixture and the silica is collected in another part of the said mixture, moving a portion of said medium together with iron values collected therein away from the remainder of said medium and the silica collected therein, bringing another portion of said medium of apparent density substantially less than the said iron values into contact with the resulting stream of medium and sunken ore fraction at a point spaced from said remainder of said medium and silica, and flowing the last introduced medium in contact with the said stream and in a direction counter to the direction of flow of said stream.

References Cited in the file of this patent

UNITED STATES PATENTS

| | | |
|---|---|---|
| 1,656,271 | Downs et al. | Jan. 17, 1928 |
| 2,365,734 | Tromp | Dec. 26, 1944 |
| 2,368,416 | Holt | Jan. 30, 1945 |
| 2,378,357 | Erck | June 12, 1945 |
| 2,621,791 | Bitzler | Dec. 16, 1952 |

OTHER REFERENCES

Bitzler: "A New Separating Vessel for Sink and Float Seperation," T. P. 2,1.82 A. IMME, May 1947, 19 pages.

Quarterly of the Colorado School of Mines, vol. 43, No. 1, January 1948, pages 32–34.

Quarterly of the Colorado School of Mines, vol. 43, No. 1, January 1948, pages 57 to 61, 67 to 69.